United States Patent
Chien et al.

(10) Patent No.: US 11,575,864 B2
(45) Date of Patent: Feb. 7, 2023

(54) PROJECTION SYSTEM AND PROJECTION METHOD

(71) Applicant: Coretronic Corporation, Hsin-Chu (TW)

(72) Inventors: Chun-Lin Chien, Hsin-Chu (TW); Chung-Lung Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/696,900

(22) Filed: Mar. 17, 2022

(65) Prior Publication Data

US 2022/0303512 A1    Sep. 22, 2022

Related U.S. Application Data

(60) Provisional application No. 63/164,509, filed on Mar. 22, 2021.

(30) Foreign Application Priority Data

Aug. 23, 2021    (CN) .......................... 202110967020.6

(51) Int. Cl.
    H04N 9/31    (2006.01)
(52) U.S. Cl.
    CPC ......... H04N 9/3185 (2013.01); H04N 9/3147 (2013.01); H04N 9/3182 (2013.01)
(58) Field of Classification Search
    CPC .. H04N 9/3185; H04N 9/3147; H04N 9/3182; H04N 9/31

USPC ................. 348/744–747, 806, 807
See application file for complete search history.

(56) References Cited

U.S. PATENT DOCUMENTS

| 10,063,821 | B2 | 8/2018 | Yoshimura |
| 2014/0104582 | A1* | 4/2014 | Mori ..................... H04N 9/3182 353/30 |

FOREIGN PATENT DOCUMENTS

CN    103731648    4/2014

\* cited by examiner

*Primary Examiner* — Sherrie Hsia
(74) *Attorney, Agent, or Firm* — JCIPRNET (57) ABSTRACT

A projection system and a projection method are provided. The projection system includes a first projector and a second projector. A first projection image projected by the first projector and a second projection image projected by the second projector are partially overlapped. A projection region edit menu is executed to display multiple adjustment points and multiple connecting lines on the first projection image. A position of a selected adjustment point among the multiple adjustment points and positions of two connecting lines connected to the selected adjustment point among the multiple adjustment points displayed on the first projection image are changed according to a first moving instruction to select a closed region formed by the multiple connecting lines in a non-overlap region of the first projection image. The projection method is adapted to the projection system that provides a blending projection effect of multiple projectors having an even brightness.

16 Claims, 6 Drawing Sheets

FIG. 7

PROJECTION SYSTEM AND PROJECTION METHOD

CROSS-REFERENCE TO RELATED APPLICATION

This application claims the priority benefit of U.S. provisional application Ser. No. 63/164,509, filed on Mar. 22, 2021 and China application serial no. 202110967020.6, filed on Aug. 23, 2021. The entirety of the above-mentioned patent application is hereby incorporated by reference herein and made a part of this specification.

BACKGROUND

Technical Field

The invention relates to a display technology, and in particular, to a projection system and a projection method which are configured to adjust a brightness of a blended projection image.

Description of Related Art

When a projection system performs blending projection with multiple projectors, an overlap region is formed among multiple projection images respectively projected by the multiple projectors. A brightness of the overlap region of a blended projection image may be higher than a brightness of a non-overlap region due to projection brightness superimposing of the multiple projection images owing to light leakage of the projectors. Therefore, an overall image brightness is not even when the projection system performs blending projection, and the projection quality is thus decreased. The above issue is more obvious especially when projecting a black image. Conventionally, such issue is generally improved by adjusting positions of the multiple projection images respectively projected by the multiple projectors to eliminate the overlap region or reduce the area of the overlap region. However, the adjustment is too difficult and cumbersome.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projection system and a projection method capable of providing a blending projection effect of multiple projectors having an even brightness.

Other objectives and advantages of the invention may further be understood from technical features disclosed in the invention.

In order to achieve one or some or all of the above purposes or other purposes, the projection system of the invention includes a first projector and a second projector. The first projector includes a first projection module and a first control module. The second projector includes a second projection module and a second control module. The first projection module is configured to project a first projection image toward a projection target. The first control module is coupled to the first projection module. The second projection module is configured to project a second projection image toward the projection target. The second control module is coupled to the second projection module. The first projection image and the second projection image are partially overlapped to form an overlap region. The first control module is configured to execute an image adjustment module so that an image adjustment interface is displayed on the first projection image. When a projection region edit menu corresponding to the image adjustment interface is executed, multiple adjustment points and multiple connecting lines are displayed on the first projection image. The multiple connecting lines are respectively connected to every two adjacent points among the multiple adjustment points. The multiple connecting lines form a closed region. When the first control module receives a selecting instruction, a position of a selected adjustment point among the multiple adjustment points and positions of two connecting lines connected to the selected adjustment point among the multiple adjustment points displayed on the first projection image are changed according to a first moving instruction received by the first control module. Hence, the closed region is selected in a first non-overlap region of the first projection image.

In order to achieve one or some or all of the above purposes or other purposes, the projection method of the invention includes the following. A first projection image is projected toward a projection target through a first projection module of a first projector. A second projection image is projected toward the projection target through a second projection module of a second projector. The first projection image and the second projection image are partially overlapped to form an overlap region. An image adjustment module is executed through a first control module of the first projector so that an image adjustment interface is displayed on the first projection image. When a projection region edit menu corresponding to the image adjustment interface is executed, multiple adjustment points and multiple connecting lines are displayed on the first projection image. The multiple connecting lines are respectively connected to every two adjacent points among the multiple adjustment points. The multiple connecting lines form a closed region. When the first control module receives a selecting instruction, a position of a selected adjustment point among the multiple adjustment points and positions of two connecting lines connected to the selected adjustment point among the multiple adjustment points displayed on the first projection image are changed according to a first moving instruction received by the first control module. Hence, the closed region is selected in a first non-overlap region of the first projection image.

Based on the above, the projection system and the projection method of the invention can provide a convenient function of selecting a partial projection image to effectively and accurately adjust the brightness of the non-overlap region of the projection image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
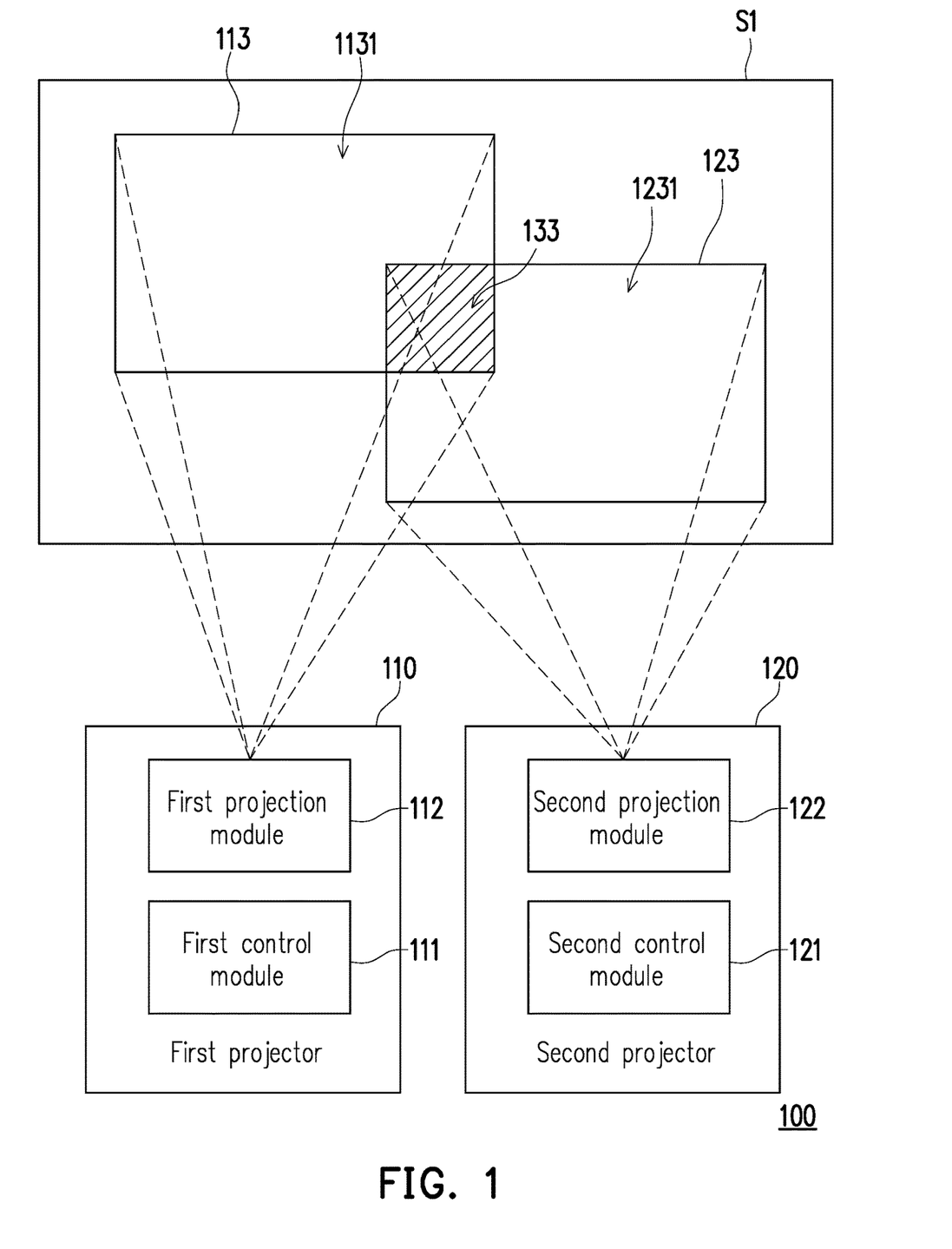
FIG. 1 is a schematic diagram of a projection system according to an embodiment of the invention.

FIG. 1 is a schematic diagram of a projection system according to an embodiment of the invention. Referring to FIG. 1, a projection system 100 includes a first projector 110 and a second projector 120. The first projector 110 includes a first control module 111 and a first projection module 112. The second projector 120 includes a second control module 121 and a second projection module 122. The first control module 111 is coupled to the first projection module 112. The second control module 121 is coupled to the second projection module 122. In the embodiment, the first projection module 112 may project a first projection image 113 toward a projection target S1. The projection target S1 may be, for example, a projection surface such as a wall surface or a projection screen. The second projection module 122 may project a second projection image 123 toward the projection target S1. In the embodiment, the first projector 110 and the second projector 120 may perform blending projection to form a blended projection image. The first projection image 113 and the second projection image 123 may be partially overlapped so that the first projection image 113 includes a first non-overlap region 1131 and an overlap region 133 and the second projection image 123 includes a second non-overlap region 1231 and the overlap region 133. The first projection image 113 and the second projection image 123 are partially overlapped to form the overlap region 133. Note that the projection system 100 of the invention may respectively adjust a brightness of the first non-overlap region 1131 of the first projection image 113 and a brightness the second non-overlap region 1231 of the second projection image 123 so that an adjusted brightness of the first non-overlap region 1131 of the first projection image 113 and an adjusted brightness of the second non-overlap region 1231 of the second projection image 123 may be the consistent with a brightness of the overlap region 133. Image information of the first projection image 113 and the second projection image 123 may be respectively stored in advance in the first control module 111 of the first projector 110 and the second control module 121 of the second projector 120. The first projection image 113 and the second projection image 123 are, for example, black images or other dark images and configured to make it easy for a user to observe a brightness difference between the first non-overlap region 1131, the second non-overlap region 1231, and the overlap region 133 so that the user may easily adjust the brightness.

The first control module 111 and the second control module 121 may, for example, respectively include a central processing unit (CPU), or other programmable general-purpose or special-purpose micro control units (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), or other similar elements or a combination of the above elements.

The first projection module 112 and the second projection module 122 may, for example, respectively include a light source module, an optical engine module, a projection lens group (or referred to as an optical system) and an image transmission interface, and a related circuit element. The light source module may include, for example, a light emitting unit such as a discharging bulb, a light emitting diode, or a laser light source. The optical engine module may include a reflective spatial light modulator or a transmissive spatial light modulator. The reflective spatial light modulator may be, for example, reflective liquid crystal on silicon (LCOS) or a digital micro-mirror device (DMD). The transmissive spatial light modulator may be, for example, a transparent liquid crystal panel. The projection lens group may include multiple lenses exhibiting a function of image amplification, and the multiple lenses may form a projection optical path.

The first control module 111 of the first projector 110 and the second control module 121 of the second projector 120 may further respectively include a memory such as a random access memory (RAM), a read-only memory (ROM), a flash memory, or similar element or a combination of the above elements. The memory may be configured to store the image information of the first projection image 113 and the second projection image 123. The memory may be configured to store an image adjustment module described in each embodiment of the invention so that the first control module 111 and the second control module 121 may respectively access and execute the image adjustment module. The image adjustment module is configured to cause the first projection image 113 and the second projection image 123 to respectively display a corresponding image adjustment interface. The image adjustment interface is, for example, an on-screen display (OSD) menu. The image adjustment interface may include a projection region edit menu. Note that the first projector 110 and the second projector 120 may be further coupled to a same external computer host or an image signal source (not illustrated) to respectively obtain two image signals. The two image signals are configured to cause the first projector 110 and the second projector 120 to project a blended projection image.

Figure 2:
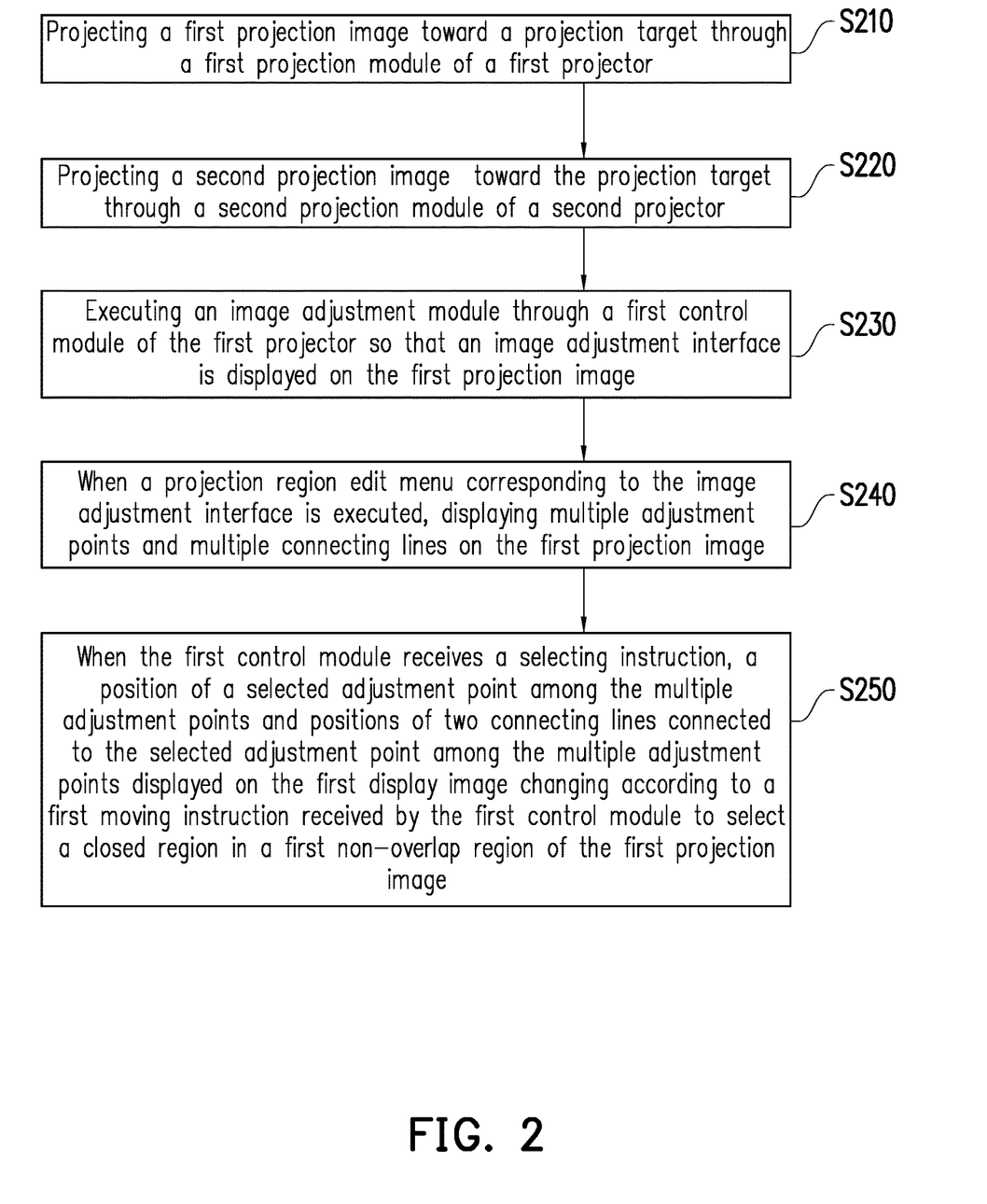
FIG. 2 is a flow chart of a projection method according to an embodiment of the invention.

FIG. 2 is a flow chart of a projection method according to an embodiment of the invention. Referring to FIG. 1 and FIG. 2, the projection system 100 may execute the following steps S210 to S250 to effectively select a non-overlap region in a projection image. Note that in the embodiment, for example, the projection system 100 may be operated in an initial projection setting phase to first adjust (turn up) the lowest brightness of the first non-overlap region 1131 and the lowest brightness of the second non-overlap region 1231 in the first projection image 113 and the second projection image 123 to the substantially same displayed brightness of the overlap region 133. (The substantially same displayed brightness is judged by an human eye of a current user.) Hence, a fully black image with an even brightness may be displayed on the overall blended projection image. Therefore, the first projector 110 and the second projector 120 may perform actual image projection based on the adjusted brightness to provide a blended projection image effect exhibiting the even brightness.

In step S210, the projection system 100 may project the first projection image 113 toward the projection target S1 through the first projection module 112 of the first projector 110. In step S220, the projection system 100 may project the second projection image 123 toward the projection target S1 through the second projection module 122 of the second projector 120. The first projection image 113 and the second projection image 123 are partially overlapped to form the overlap region 133. Note that the first projection image 113 and the second projection image 123 are respectively fully back images. The fully black image may be a projection image of the projector with the lowest projection brightness. Based on an optical projection property of the projector or a light leakage factor, although the first projection image 113 and the second projection image 123 are respectively fully back images, the first projection image 113 and the second projection image 123 still respectively have a slight brightness. In this way, the first projection image 113 and the second projection image 123 may generate a brightness addition effect on the overlap region 133 so that the brightness of the overlap region 133 is higher than the brightness of the first non-overlap region 1131 of the first projection image 113 and the brightness of the second non-overlap region 1231 of the second projection image 123.

In step S230, the projection system 100 may execute an image adjustment module through the first control module 111 of the first projector 110 so that an image adjustment interface is displayed on the first projection image 113. In step S240, when a projection region edit menu corresponding to the image adjustment interface is executed, the projection system 100 may display multiple adjustment points and multiple connecting lines on the first projection image 113. The multiple connecting lines are respectively connected to every two adjacent points among the multiple adjustment points, and the multiple connecting lines form a closed region. The multiple connecting lines may be determined based on a line-connecting method in which the multiple adjustment points are able to form the largest region. In step S250, when the first control module 111 receives a selecting instruction, a position of a selected adjustment point among the multiple adjustment points and positions of two connecting lines connected to the selected adjustment point among the multiple adjustment points displayed on the first projection image 113 are changed according to a first moving instruction received by the first control module 111 so that the projection system 100 may select the closed region in the first non-overlap region 1131 of the first projection image 113. In the embodiment, after a closed region section selects the first non-overlap region 1131 of the first projection image 113, the projection system 100 may further operate the first control module 111 of the first projector 110 to perform brightness adjustment. For example, the brightness of the first non-overlap region 1131 of the first projection image 113 is turned up. Therefore, the brightness of the first non-overlap region 1131 of the first projection image 113 may be turned up according to an adjustment result of a brightness adjustment function so that the brightness of the first non-overlap region 1131 in the first projection image 113 after brightness adjustment is the same as the brightness of the overlap region 133.

Similarly, the projection system 100 may execute another image adjustment module through the second control module 121 of the first projector 120 so that another image adjustment interface is displayed on the second projection image 123. When another projection region edit menu corresponding to the other image adjustment interface is executed, the projection system 100 may display another multiple adjustment points and another multiple connecting lines on the second projection image 120. The other multiple connecting lines are respectively connected to every two adjacent points among the other multiple adjustment points and form another closed region. When the second control module 121 receives another selecting instruction, a position of a selected adjustment point among the other multiple adjustment points and positions of two connecting lines connected to the selected adjustment point among the other multiple adjustment points displayed on the second projection image 123 are changed according to another first moving instruction received by the second control module 121 so that the projection system 100 may select the other closed region in the second non-overlap region 1231 of the second projection image 123.

In the embodiment, after another closed region section selects the second non-overlap region 1231 of the second projection image 123, the projection system 100 may further operate the second control module 121 of the second projector 120 to perform brightness adjustment. Therefore, the brightness of the second non-overlap region 1231 of the second projection image 123 may be turned up according to the adjustment result of the adjustment function so that the brightness of the second non-overlap region 1231 in the second projection image 123 after brightness adjustment is the same as the brightness of the overlap region 133. In this way, an overall image region of the blended projection image formed by the first projection image 113 and the second projection image 123 may exhibit the projection effect having the even brightness.

Figure 3:
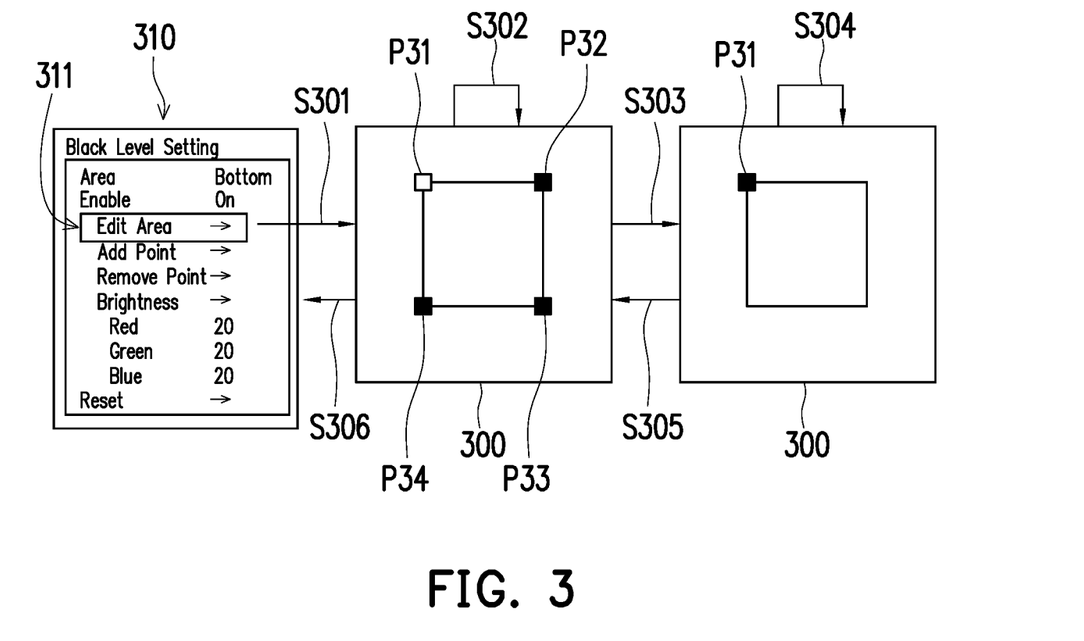
FIG. 3 is a schematic diagram illustrating moving an adjustment point according to an embodiment of the invention.

FIG. 3 is a schematic diagram illustrating moving an adjustment point according to an embodiment of the invention. Referring to FIG. 3, the embodiment describes an operation process of adjusting a position and an area range of a closed region formed by multiple connecting lines among multiple adjustment points through an image adjustment interface to effectively select a non-overlap region. In the embodiment, a user may execute an image adjustment module of a projector so that an image adjustment interface 310 may be displayed on a projection image 300. In step S301, when a projection region edit menu 311 corresponding to the image adjustment interface 310 is executed, multiple adjustment points P31 to P34 and multiple connecting lines are displayed on the projection image 300. The multiple connecting lines are respectively connected to every two adjacent points among the multiple adjustment points P31 to P34 to form a closed region. Note that a number and positions of the adjustment points are set in advance. The adjustment points may be disposed at any positions on the projection image 300, and the invention is not limited to FIG. 3. In step S302, the user may select one of the adjustment points P31 to P34 through an external remote control of the projector or a physical selection button on a machine body of the projector. In addition, a selected adjustment point (e.g. the adjustment point P31) among the adjustment points P31 to P34 displayed on the projection image 300 may be displayed in a blinking state. Or, the selected adjustment point (e.g. the adjustment point P31) among the adjustment points P31 to P34 displayed on the projection image 300 may be displayed to have a different shape, color, or brightness from the other non-selected adjustment points (e.g. the adjustment point P32 to P34) among the adjustment points P31 to P34 so that the user is able to easily identify the position of the selected adjustment point. In step S303, the user may select one of the adjustment points P31 to P34 (e.g. the adjustment point P31) through the external remote control of the projector or the physical selection button on the machine body of the projector so that only the selected adjustment point (e.g. the adjustment point P31) may be displayed on the projection image 300.

In step S304, the user may provide a moving instruction to a control module of the projector through the external remote control of the projector or a physical direction button on the machine body of the projector to move the adjustment point P31. Hence, a position of the selected adjustment point P31 and positions of two connecting lines (e.g. a connecting line between the adjustment point P31 and the adjustment point P32 and a connecting line between the adjustment point P31 and the adjustment point P34) connected to the selected adjustment point P31 are changed according to the moving instruction. Next, in step S305, the user may provide an exit instruction through the external remote control of the projector or the physical direction button on the machine body of the projector to return to the state of selecting the adjustment points P31 to P34. As a result, the user may respectively perform the above steps S302 to S304 on the adjustment points P31 to P34 to fine tune a position and an area range of the closed region formed by the connecting lines among the adjustment points P31 to P34 to effectively select the closed region in the non-overlap region of the projection image. Last, in step S306, the user may provide the exit instruction again through the external remote control of the projector or the physical direction button on the machine body of the projector to terminate the region adjustment function of the closed region.

Figure 4:
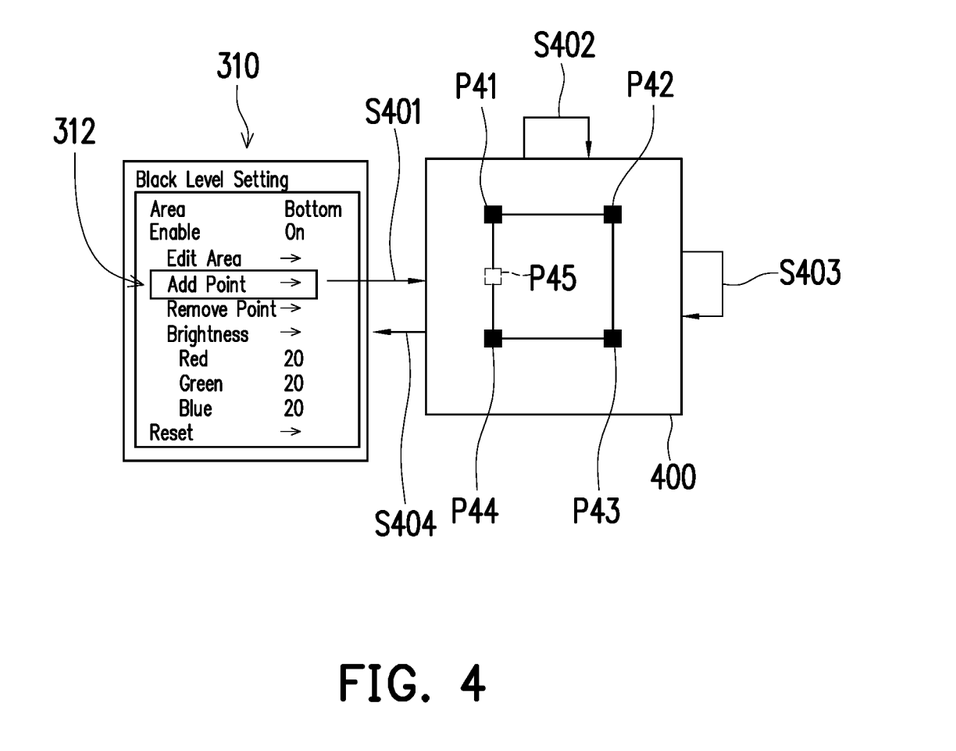
FIG. 4 is a schematic diagram illustrating adding an adjustment point according to an embodiment of the invention.

FIG. 4 is a schematic diagram illustrating adding an adjustment point according to an embodiment of the invention. Referring to FIG. 4, the embodiment describes how to add an adjustment point through the image adjustment interface. In the embodiment, in step S401, when an adjustment point adding menu 312 corresponding to the image adjustment interface 310 is executed, multiple adjustment points P41 to P44 and multiple connecting lines are displayed on a projection image 400. The connecting lines are respectively connected to every two adjacent points among the adjustment points P41 to P44 to form a closed region. When the control module of the projector receives an adding instruction generated by the user through the external remote control of the projector or a physical confirmation button on the machine body of the projector, a new adjustment point may be added and displayed on one of the connecting lines among the adjustment points P41 to P44 displayed on the projection image 400. A new adjustment point P45 may be generated, for example, on a connecting line between the adjustment point P41 and the adjustment point P44. In step S402, a position of the new adjustment point P45 and positions of two connecting lines connected to the new adjustment point P45 are changed according to a moving instruction generated by the user through the external remote control of the projector or the physical direction button on the machine body of the projector and received by the control module of the projector. The new adjustment point P45 may, for example, move to a connecting line between the adjustment point P41 and the adjustment point P42, a connecting line between the adjustment point P42 and the adjustment point P43, or a connecting line between the adjustment point P43 and the adjustment point P44. In step S403, the user may provide a confirmation instruction to the control module of the projector through the external remote control of the projector or the physical confirmation button on the machine body of the projector to confirm the position of the new adjustment point P45. Last, in step S404, the user may provide the exit instruction to the control module of the projector through the external remote control of the projector or the physical direction button on the machine body of the projector to terminate the adjustment point adding function.

Figure 5A:
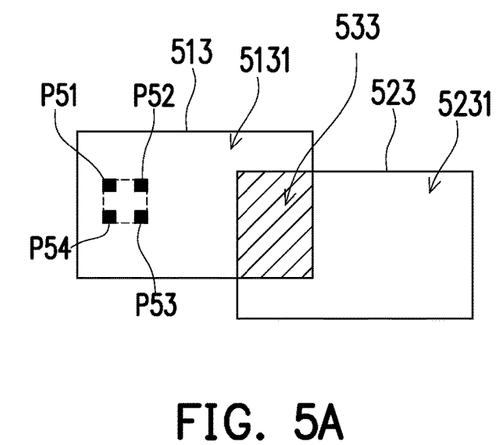
FIG. 5A to FIG. 5F are schematic diagrams illustrating a process of adjusting an area range of a closed region according to an embodiment of the invention.

FIG. 5A to FIG. 5F are schematic diagrams illustrating a process of adjusting an area range of a closed region according to an embodiment of the invention. Referring to FIG. 1 and FIG. 5A to FIG. 5F, the embodiment is provided to describe an adjustment method of the area range of the closed region in a projection image projected by the first projector 110 of the projection system 100. The second projector 120 may be operated in a similar manner and the operation thereof thus is not repeated. For example, the first projector 110 may project a first projection image 513 as shown in FIG. 5A on the projection target S1, and the second projector 120 may project a second projection image 523 as shown in FIG. 5A on the projection target S1. The first projection image 513 and the second projection image 523 are partially overlapped. The first projection image 513 includes a first non-overlap region 5131 and an overlap region 533. The second projection image 523 includes a second non-overlap region 5231 and the overlap region 533.

Figure 5B:
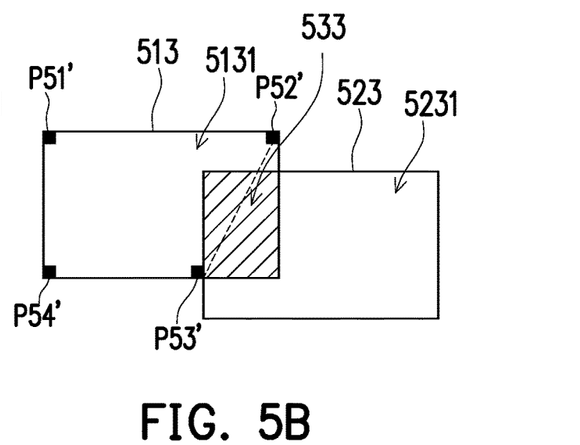
Figure 5C:
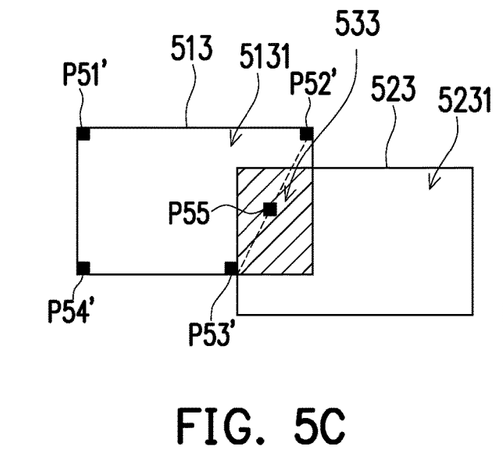
Figure 5D:
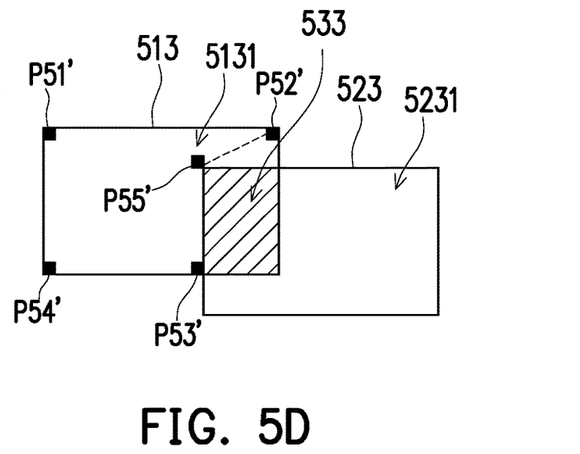
Figure 5E:
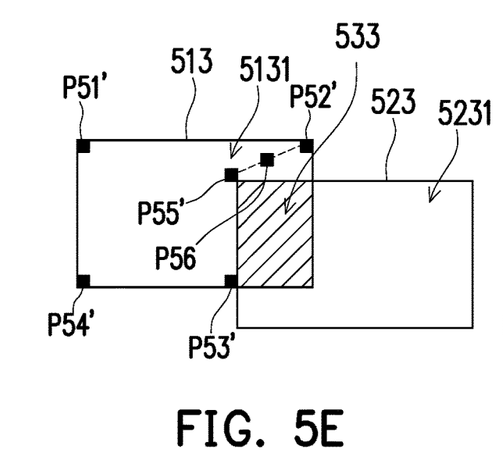
Figure 5F:
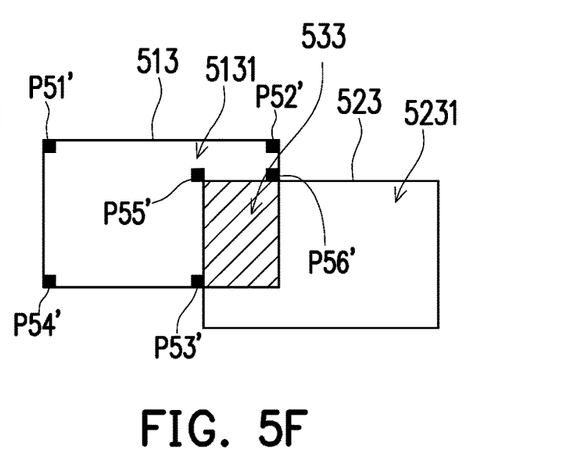

As shown in FIG. 5A, the user may execute the image adjustment module of the projector 110 so that multiple adjustment points P51 to P54 and multiple connecting lines may be displayed on the first projection image 513. The user may operate a projector (the first projector 110) to execute the above steps S301 to S306 in FIG. 3 to adjust positions of the adjustment points P51 to P54 to positions of adjustment points P51' to P54' as shown in FIG. 5B. As shown in FIG. 5C, the user may operate the projector to execute the above steps S401 to S404 in FIG. 4 to add an adjustment point P55. The user may operate the projector to execute the above steps S301 to S306 in FIG. 3 again to adjust a position of the adjustment point P55 to a position of an adjustment point P55' as shown in FIG. 5D. As shown in FIG. 5E, the user may operate the projector to execute the above steps S401 to S404 in FIG. 4 again to add an adjustment point P56. The user may operate the projector to execute the above steps S301 to S306 in FIG. 3 again to adjust a position of the adjustment point P56 to a position of an adjustment point P56' as shown in FIG. 5F. As a result, a closed region formed by connecting lines that the adjustment points P51' to P56' are sequentially connected to may be completely selected in a position of the first non-overlap region 5131 of the first projection image 513.

Figure 6A:
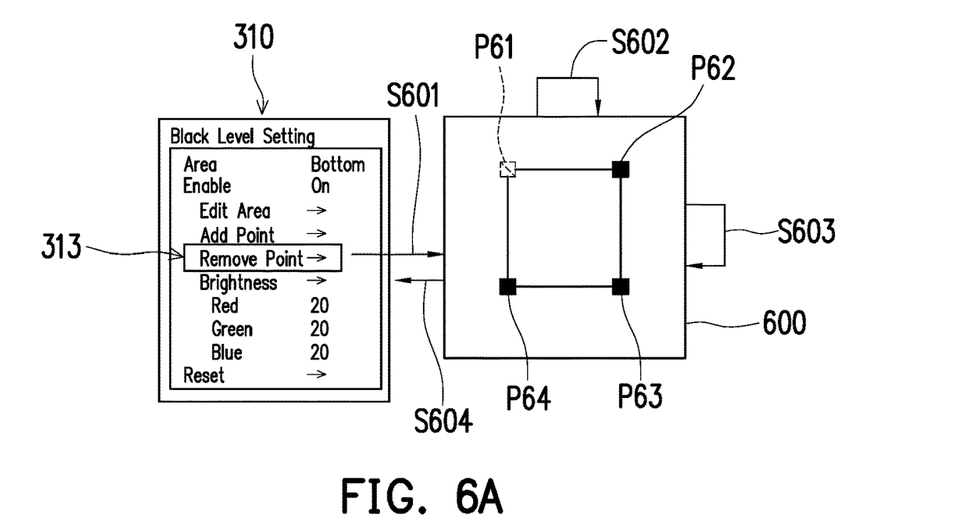
FIG. 6A is a schematic diagram illustrating removing an adjustment point according to an embodiment of the invention.

FIG. 6A is a schematic diagram illustrating removing an adjustment point according to an embodiment of the invention. Referring to FIG. 6A, the embodiment describes how to remove an adjustment point through the image adjustment interface. In the embodiment, multiple adjustment points P61 to P64 and multiple connecting lines are displayed on a projection image 600. The connecting lines are respectively connected to every two adjacent points among the adjustment points P61 to P64 to form a closed region. In step S601, when an adjustment point removing menu 313 corresponding to the image adjustment interface 310 is executed, one of the adjustment points P61 to P64 may be selected. A selected adjustment point (e.g. the adjustment point P61) among the adjustment points P61 to P64 displayed on the projection image 600 may be displayed in a blinking state. Or, the selected adjustment point (e.g. the adjustment point P61) among the adjustment points P61 to P64 displayed on the projection image 600 may be displayed to have a different shape, color, or brightness from the other non-selected adjustment points (e.g. the adjustment point P62 to P34) among the adjustment points P61 to P64.

In step S602, the user may provide the moving instruction to the control module of the projector through the external remote control of the projector or the physical direction button on the machine body of the projector to select one of the adjustment points P61 to P64. In step S603, the user may provide a removing instruction to the control module of the projector through the external remote control of the projector or a physical removing button on the machine body of the projector. When the control module of the projector receives the removing instruction, the selected adjustment point (e.g. the adjustment point P61) among the adjustment points P61 to P64 is removed, and the two connecting lines connected to the selected adjustment point (e.g. the adjustment point P64) among the adjustment points P61 to P64 are refreshed into new connecting lines. The new connecting lines are connected to the two adjustment points (e.g. the adjustment point P62 and the adjustment point P64) previously connected to the two connecting lines connected to the selected adjustment point (e.g. the adjustment point P61) among the adjustment points P61 to P64. Last, in step S604, the user may provide the exit instruction to the control module of the projector through the external remote control of the projector or the physical direction button on the machine body of the projector to terminate the adjustment point removing function.

Figure 6B:
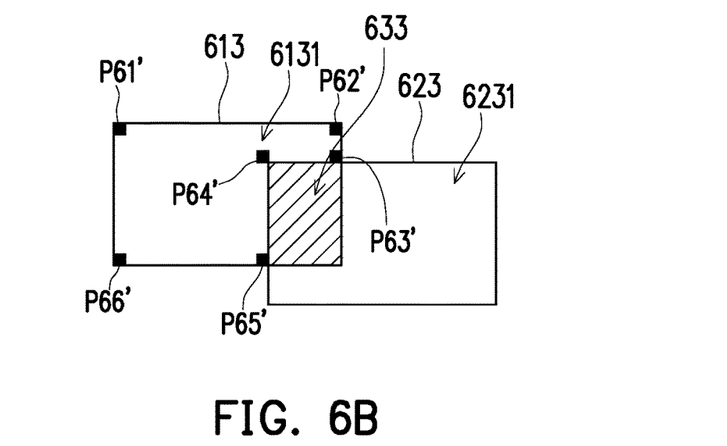
FIG. 6B and FIG. 6C are schematic diagrams illustrating a process of adjusting an area range of a closed region according to another embodiment of the invention.
Figure 6C:
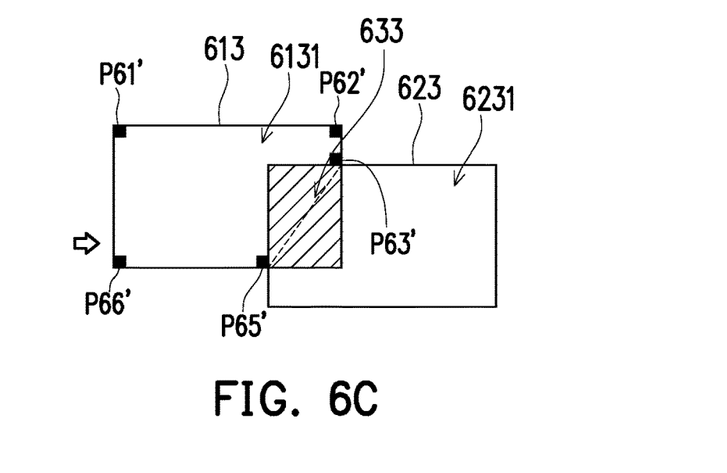

FIG. 6B and FIG. 6C are schematic diagrams illustrating a process of adjusting an area range of a closed region according to another embodiment of the invention. Referring to FIG. 1, FIG. 6B, and FIG. 6C, the embodiment is provided to describe another adjustment method of the area range of the closed region in a projection image projected by the projector 110 of the projection system 100. The projector 120 may be operated in a similar manner and the operation thereof thus is not repeated. For example, the first projector 110 may project a first projection image 613 as shown in FIG. 6A on the projection target S1, and the second projector 120 may project a second projection image 623 as shown in FIG. 6A on the projection target S1. The first projection image 613 and the second projection image 623 are partially overlapped. The first projection image 613 includes a first non-overlap region 6131 and an overlap region 633. The second projection image 623 includes a second non-overlap region 6231 and the overlap region 633.

The user may execute the image adjustment module of the projector so that the image adjustment interface may be displayed on the first projection image 613. As shown in FIG. 6B, when the projection region edit menu corresponding to the image adjustment interface is executed, multiple adjustment points P61' to P66' and multiple connecting lines between every two of the adjustment points P61' to P66' may be displayed on the first projection image 613. Positions of the adjustment points P61' to P66' and an area range of a closed region surrounded by the connecting lines of the adjustment points P61' to P66' may be, for example, an adjustment result after the operation process of FIG. 5A to FIG. 5F is executed. The user may operate the projector to execute the above steps S601 and S602 in FIG. 6A to select the adjustment point P64' that the user desires to remove. As shown in FIG. 6C, the user may operate the projector to execute the above steps S603 and S604 in FIG. 6A to remove the adjustment point P64' to cause the area range of the closed region to change correspondingly.

Figure 7:
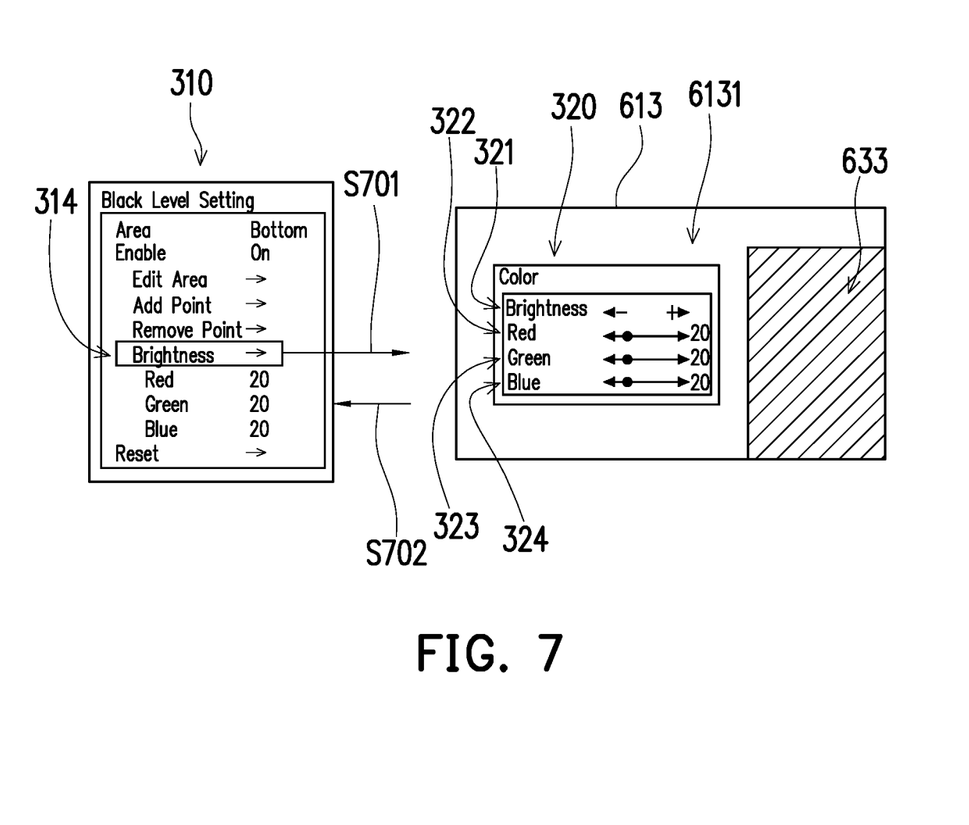
FIG. 7 is a schematic diagram illustrating brightness adjustment of a non-overlap region of a projection image according to an embodiment of the invention.

FIG. 7 is a schematic diagram illustrating brightness adjustment of a non-overlap region of a projection image according to an embodiment of the invention. Referring to FIG. 7, the embodiment describes how to adjust a brightness of a partial region of a projection image projected by a projector through the image adjustment interface. Taking the first projection image 613 in FIG. 6B as an example, in step S701, when a brightness adjustment menu 314 corresponding to the image adjustment interface 310 is executed, a brightness adjustment interface 320 may be correspondingly displayed on the first projection image 613. To avoid an image being blocked and the user being unable to effectively determine whether a brightness is adjusted to be even, the image adjustment interface 310 may temporarily disappear so that only the brightness adjustment interface 320 is displayed. In the embodiment, the brightness adjustment interface 320 may include a brightness adjustment icon 321 and multiple pixel adjustment icons 322 to 324 (e.g. red, green, and blue pixel adjustment icons). When an adjustment function corresponding to the brightness adjustment icon 321 and one of the pixel adjustment icons 322 to 324 is executed, a brightness of the first non-overlap region 6131 of the first projection image 613 are changed according to an adjustment result of the adjustment function. Note that when the adjustment function of the brightness adjustment icon 321 is executed, pixel values of the pixel adjustment icons 322 to 324 are simultaneously increased or decreased. In this way, the brightness of the first non-overlap region 6131 of the first projection image 613 is turned up according to the adjustment result of the adjustment function so that the brightness of the first non-overlap region 6131 in the first projection image 613 after brightness adjustment may be the same as a brightness of an overlap region 633. In step S702, the user may provide the exit instruction to the control module of the projector through the external remote control of the projector or the physical direction button on the machine body of the projector to terminate the brightness adjustment function.

In summary of the above, in the projection system and the projection method of the invention, the user may conveniently, fast, and accurately perform selection operation on the non-overlap region of each of the projection images of the multiple projectors in the projection system. The brightness of the non-overlap region of each of the projection images may be respectively and accurately adjusted so that the blended projection image formed by the multiple projection images respectively provided by the multiple projectors may exhibit the projection effect having the even brightness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising a first projector and a second projector, wherein
   the first projector comprises a first projection module and a first control module, wherein
      the first projection module is configured to project a first projection image toward a projection target; and
      the first control module is coupled to the first projection module; and
   the second projector comprises a second projection module and a second control module, wherein
      the second projection module is configured to project a second projection image toward the projection target; and
      the second control module is coupled to the second projection module, wherein the first projection image and the second projection image are partially overlapped to form an overlap region,
   wherein the first control module is configured to execute an image adjustment module so that an image adjustment interface is displayed on the first projection image, and in response to a projection region edit menu corresponding to the image adjustment interface being executed, a plurality of adjustment points and a plurality of connecting lines are displayed on the first projection image, wherein the plurality of connecting lines are respectively connected to every two adjacent points among the plurality of adjustment points, and the plurality of connecting lines form a closed region,
   wherein in response to the first control module receiving a selecting instruction, a position of a selected adjustment point among the plurality of adjustment points and a plurality of positions of two connecting lines connected to the selected adjustment point among the plurality of adjustment points displayed on the first projection image are changed according to a first moving instruction received by the first control module so that the closed region is selected in a first non-overlap region of the first projection image.

2. The projection system according to claim 1, the selected adjustment point among the plurality of adjustment points displayed on the first projection image is displayed in a blinking state.

3. The projection system according to claim 1, wherein the selected adjustment point among the plurality of adjustment points displayed on the first projection image is displayed to have a different shape, color, or brightness from a plurality of other non-selected adjustment points among the plurality of adjustment points.

4. The projection system according to claim 1, wherein in response to the first control module receiving an adding instruction, a new adjustment point is added and displayed on one of the plurality of the connecting lines displayed on the first projection image, wherein a position of the new adjustment point and a plurality of positions of two connecting lines connected to the new adjustment point are changed according to a second moving instruction received by the first control module.

5. The projection system according to claim 1, wherein in response to the first control module receiving a removing instruction, the selected adjustment point among the plurality of adjustment points is removed, and the two connecting lines connected to the selected adjustment point among the plurality of adjustment points are refreshed into a plurality of new connecting lines, wherein the new connecting lines are connected to two adjustment points among the plurality of adjustment points previously connected to the selected adjustment point among the plurality of adjustment points with the connecting lines.

6. The projection system according to claim 1, wherein in response to a brightness adjustment menu corresponding to the image adjustment interface being executed, a brightness adjustment interface is displayed on the first projection image, and the brightness adjustment interface comprises a brightness adjustment icon and a plurality of pixel adjustment icons.

7. The projection system according to claim 6, wherein in response to an adjustment function corresponding to the brightness adjustment icon and one of the pixel adjustment icons being executed, a brightness of the first projection image in the first non-overlap region is changed according to an adjustment result of the adjustment function.

8. The projection system according to claim 7, wherein the brightness of the first projection image in the first non-overlap region is turned up according to the adjustment result of the adjustment function so that the brightness of the first non-overlap region in the first projection image after brightness adjustment is the same as a brightness of the overlap region.

9. A projection method, comprising:
projecting a first projection image toward a projection target through a first projection module of a first projector;
projecting a second projection image toward the projection target through a second projection module of a second projector, wherein the first projection image and the second projection image are partially overlapped to form an overlap region;
executing an image adjustment module through a first control module of the first projector so that an image adjustment interface is displayed on the first projection image;
in response to a projection region edit menu corresponding to the image adjustment interface being executed, displaying a plurality of adjustment points and a plurality of connecting lines on the first projection image, wherein the plurality of connecting lines are respectively connected to every two adjacent points among the plurality of adjustment points, and the plurality of connecting lines form a closed region; and
in response to the first control module receiving a selecting instruction, a position of a selected adjustment point among the plurality of adjustment points and a plurality of positions of two connecting lines connected to the selected adjustment point among the plurality of adjustment points displayed on the first projection image being changed according to a first moving instruction received by the first control module so that the closed region is selected in a first non-overlap region of the first projection image.

10. The projection method according to claim 9, wherein the selected adjustment point among the plurality of adjustment points displayed on the first projection image is displayed in a blinking state.

11. The projection method according to claim 9, wherein the selected adjustment point among the plurality of adjustment points displayed on the first projection image is displayed to have a different shape, color, or brightness from a plurality of other non-selected adjustment points among the plurality of adjustment points.

12. The projection method according to claim 9, further comprising:
in response to the first control module receiving an adding instruction, adding and displaying a new adjustment point on one of the plurality of the connecting lines displayed on the first projection image, wherein a position of the new adjustment point and a plurality of positions of two connecting lines connected to the new adjustment point are changed according to a second moving instruction received by the first control module.

13. The projection method according to claim 9, further comprising:
in response to the first control module receiving a removing instruction, removing the selected adjustment point among the plurality of adjustment points, and refreshing the two connecting lines connected to the selected adjustment point among the plurality of adjustment points into a plurality of new connecting lines, wherein the new connecting lines are connected to two adjustment points among the plurality of adjustment points previously connected to the selected adjustment point among the plurality of adjustment points with the connecting lines.

14. The projection method according to claim 9, further comprising:
in response to a brightness adjustment menu corresponding to the image adjustment interface being executed, displaying a brightness adjustment interface on the first projection image, wherein the brightness adjustment interface comprises a brightness adjustment icon and a plurality of pixel adjustment icons.

15. The projection method according to claim 14, further comprising:
in response to an adjustment function corresponding to the brightness adjustment icon and one of the pixel adjustment icons being executed, a brightness of the first projection image in the first non-overlap region being changed according to an adjustment result of the adjustment function.

16. The projection method according to claim 15, further comprising:
turning up the brightness of the first projection image in the first non-overlap region according to the adjustment result of the adjustment function so that the brightness of the first non-overlap region in the first projection image after brightness adjustment is the same as a brightness of the overlap region.

* * * * *